(12) United States Patent  
Mokashi et al.

(10) Patent No.: US 10,699,023 B1  
(45) Date of Patent: Jun. 30, 2020

(54) ENCRYPTION PROFILES FOR ENCRYPTING USER-SUBMITTED DATA

(71) Applicant: Amazon Technologies, Inc., Reno, NV (US)

(72) Inventors: Ronil Sudhir Mokashi, Mercer Island, WA (US); Francesco De Martino, Salerno (IT); Shreeja Kumar, Seattle, WA (US); Prashant Verma, Seattle, WA (US); Vijaya Rama Reddy Kistampalli, Seattle, WA (US); Sorin Manole, Iasi (RO); Andrii Galyuzin, Seattle, WA (US); Cristi Ursachi, Isai (RO)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 129 days.

(21) Appl. No.: 15/872,462

(22) Filed: Jan. 16, 2018

Related U.S. Application Data

(60) Provisional application No. 62/588,912, filed on Nov. 20, 2017.

(51) Int. Cl.
  *G06F 21/62* (2013.01)
  *H04L 29/06* (2006.01)
  *G06N 20/00* (2019.01)

(52) U.S. Cl.
  CPC .......... *G06F 21/62* (2013.01); *G06F 21/6245* (2013.01); *G06N 20/00* (2019.01); *H04L 63/10* (2013.01); *G06F 2221/2141* (2013.01)

(58) Field of Classification Search
  CPC ............... G06F 21/62; G06F 21/6245; G06F 2221/2141; G06N 20/00; H04L 63/10
  See application file for complete search history.

(56) References Cited

U.S. PATENT DOCUMENTS

| 7,111,005 B1* | 9/2006 | Wessman | G06F 21/604 |
| 2010/0031335 A1* | 2/2010 | Handler | H04L 9/3226 726/8 |
| 2014/0052999 A1* | 2/2014 | Aissi | G06F 21/64 713/189 |
| 2014/0201824 A1* | 7/2014 | Agbabian | G06F 21/6245 726/6 |
| 2017/0126644 A1* | 5/2017 | Ullrich | H04L 63/061 |
| 2017/0228559 A1* | 8/2017 | Jackson | G06F 21/6245 |

(Continued)

*Primary Examiner* — Matthew Smithers
(74) *Attorney, Agent, or Firm* — Hogan Lovells US LLP

(57) ABSTRACT

Various approaches enable real-time data encryption using an encryption profile that enables a customer to specify the type of data to encrypt and the encryption keys to use when encrypting the data. A profile editor that a customer (e.g., a customer of a content provider) can use to create and manage encryption profiles that can be used to encrypt data can be provided. A profile editor or set of request parameters can allow customers to configure content distributions and associate encryption keys with a profile to encrypt user sensitive data. A customer can select, define, and/or modify the encryption options or other configuration settings for a profile. Once set, the profile can be used to securely ingest user-submitted data to customers' web servers. For example, a request can be analyzed to determine data fields of the request. Based on one or more profiles associated with the customer, the data in those fields can be encrypted with the appropriate encryption key per the profiles.

17 Claims, 8 Drawing Sheets

(56) References Cited

U.S. PATENT DOCUMENTS

| | | | | |
|---|---|---|---|---|
| 2017/0262525 A1* | 9/2017 | Eigner | .................... | H04L 67/30 |
| 2017/0277775 A1* | 9/2017 | Eigner | ................ | G06F 17/2205 |
| 2017/0359331 A1* | 12/2017 | Bonnet | ................ | H04L 63/083 |
| 2018/0260582 A1* | 9/2018 | Brouwer | ................ | H04L 67/04 |

* cited by examiner

500

New Profile — 502

Name: EncryptionProfile
Description:

Parameters — 504
Field Pattern

| Field Name | Key Selection | Multiple Keys |
|---|---|---|
| | ▼ | ☐ |
| Field Name | Key Selection | Multiple Keys |
| | ▼ | ☐ |

Key Import

Name: My-key
Profile: EncryptionProfile ▼ — 522

[Import] [Cancel]

ENCRYPTION PROFILES FOR ENCRYPTING USER-SUBMITTED DATA

CROSS-REFERENCES TO RELATED APPLICATIONS

This application is claims priority to Provisional U.S. Application No. 62/588,912, entitled "ENCRYPTION PROFILES FOR ENCRYPTING USER-SUBMITTED DATA," filed Nov. 20, 2017; which is incorporated herein by reference for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Cloud resources, such as may be provided through one or more Web services, can be particularly beneficial for tasks such as obtaining user-submitted information through web or local applications. The information may then be used by various resources. However, such information is at risk of accidental (or intentional) data loss. What is needed is a way to automatically secure user-submitted information.

BRIEF DESCRIPTION OF THE DRAWINGS

Various embodiments in accordance with the present disclosure will be described with reference to the drawings, in which:

FIGS. 5A and 5B illustrate example user interfaces that can be utilized in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to encrypting data in a network environment. In particular, various approaches enable real-time data encryption per an encryption profile that allows a customer to specify the type of data to encrypt and the encryption keys or other security approaches to use when encrypting the data. In an embodiment, a set of request parameters can be used to create an encryption profile, which can define many of the configuration settings for encrypting received data. In various embodiments, a user utilizing a website or application provided by a customer may submit information, including sensitive information such as payment information, personally identifiable information, and the like via the website or application. The website or application may utilize resources of the network environment to perform a variety of tasks. The resources can be provided using shared resources that are allocated as appropriate, and may include virtual machines, servers, databases, among other such resources. Because the website or application is using network resources, it can be desirable to automatically encrypt the information to protect against unauthorized access to the information.

Accordingly, consistent with various embodiments, in order to provide enhanced security, data specific encryption keys and other secure data transfer approaches can be automatically used to encrypt user-submitted information in real-time per one or more encryption profiles. A customer can create one or more encryption profiles to manage configuration settings that specify which data is to be encrypted and which encryption keys are to be used to encrypt the data. The encrypted data is then protected in transit, when stored or cached or otherwise retained, or accessed by resources of the network environment. Resources requiring access to the encrypted data (e.g., a payment processing system needing access to a credit card number) that have access to appropriate decryption keys can decrypt and use the data as necessary.

Various other such functions can be used as well within the scope of the various embodiments as would be apparent to one of ordinary skill in the art in light of the teachings and suggestions contained herein.

Figure 1:
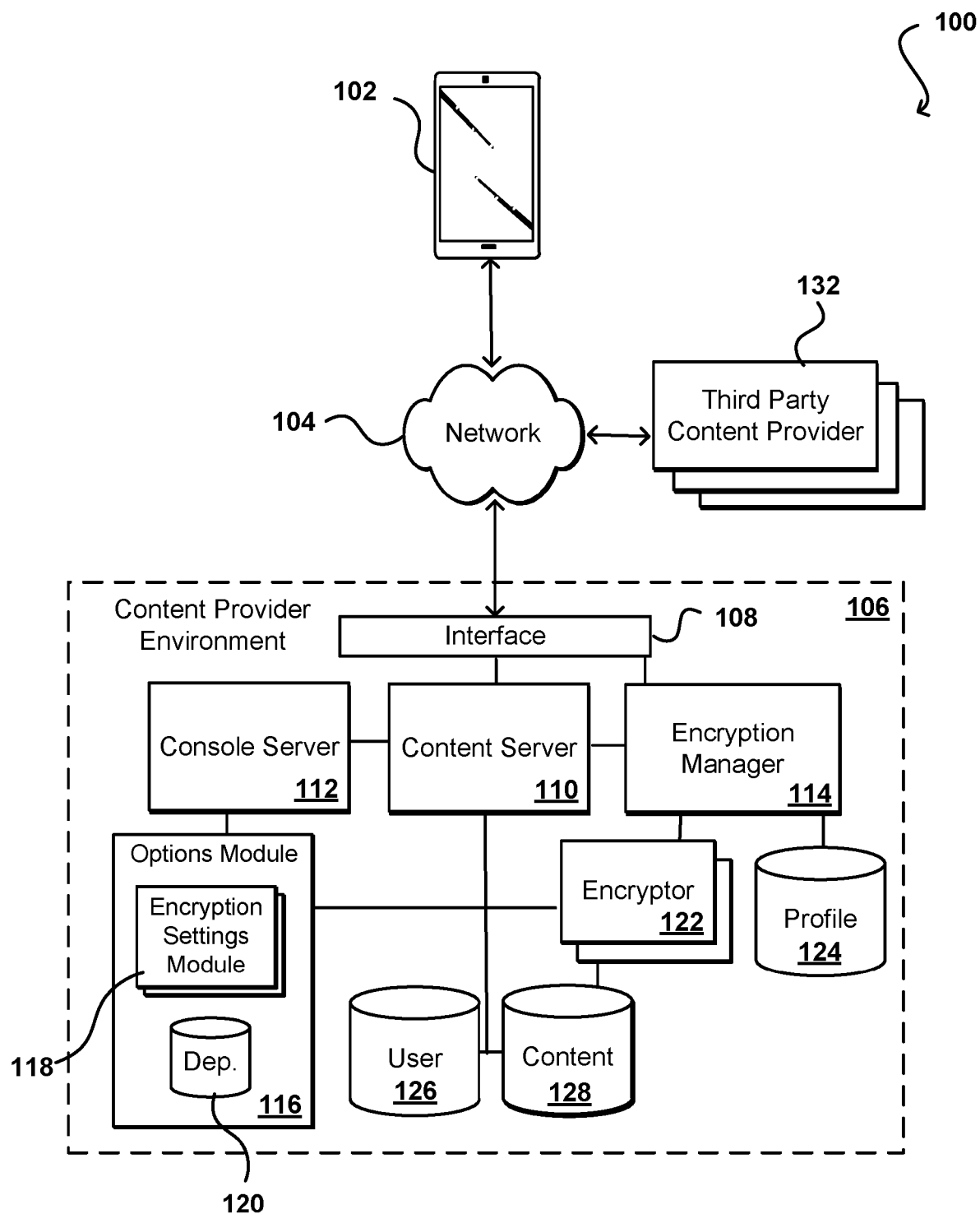
FIG. 1 illustrates an example data encrypting system that can be utilized in accordance with various embodiments.

FIG. 1 illustrates an example content delivery system 100 that can be used to implement aspects of the various embodiments. In this example, a client computing device 102 can submit a request for content across at least one network 104 to be received by a content provider environment 106. This can include a request for specific content or a subscription to have content pushed to the client device 102, among other such options. In at least some embodiments the request can include a request for content to be displayed on, or presented via, the computing device 102, and in many cases will include audio, video, or other media content that is encoded for presentation by the client device 102. In various embodiments the request can include user sensitive data, such as payment instruments, social security numbers, phone numbers, addresses, shipping manifests, documents, and the like.

The network(s) 104 can include any appropriate network, such as the Internet, a local area network (LAN), a cellular network, an Ethernet, or other such wired and/or wireless network. The content provider environment 106 can include any appropriate resources for providing content from a resource provider, as may include various servers, data stores, and other such components known or used for providing content from across a network (or from the "cloud"). As mentioned elsewhere herein, the client computing device 102 can be any appropriate computing or processing device, as may include a desktop or notebook computer, smartphone, tablet, wearable computer (i.e., smart watch, glasses, or contacts), set top box, or other such system or device. An interface layer 108, when receiving a request or call, can determine the type of call or request and cause information to be forwarded to the appropriate component or sub-system. For example, a request for content might be forwarded to a content server 110 while a request to specify encryption parameters or generate an encryption profile might be forwarded to an encryption manager 114 or console server 112, among other such options. These calls or requests can also come from third parties, such as streaming content providers who utilize the resources of the content provider environment 106, and third party providers 132 can provide at least some of the media content to be stored to a media repository 128 and/or encoded for display on the client device 102 as discussed herein.

In this example, a call or request received to the content provider environment 106 can be received by an interface layer 108 of the environment. The request can include sensitive data. As known for network environments, the interface layer can include components such as interfaces (e.g., APIs), load balancers, request and/or data routers, and the like. If the request is a request for content, such as for a video data stream to be provided to the client device 102, information for the request can be directed to one or more content servers 110, which can obtain the content from a media data store 128 or other such repository or live media source (or data cache temporarily storing media from the live media source) to be sent back across the network(s) 104 to the client device 102, which can be the device submitting the request or a device identified by the request, among other such options. In some embodiments, information for the request might also be compared against user data in a user data store 126 or other such location to determine, for example, whether the user has access rights to that content, and potentially the formats or versions to which the user has access rights.

In at least some embodiments a request from an operator, an administrator, a client device 102, a third party provider 132, or another such source might include a request to specify one or more sets of encryption parameters to be used to encrypt data. Accordingly, information regarding the encryption parameters can be provided to an encryption manager 114, or other such component or service that is able to receive the information through an appropriate interface (i.e., an API or console) and cause a profile and one or more encryption keys or other data protection information to be stored to at least one appropriate repository 124 as discussed elsewhere herein. In various embodiments, when a request that is associated with user information is received, the encryption manager 114 can use the profile and encryption keys to determine the appropriate data to encrypt, and can pass that to one or more encryptors 122, such as may include encrypting applications running on one or more allocated servers (physical or virtual), which can encrypt the data using encryption keys per the profile, which can then be provided an appropriate component in the content provider environment. An example encryption profile is given by:

```
<ProfileConfig>
    <Name>string</Name><Type>string</Type><EncryptionEntities>
      <Quantity>integer</Quantity>
      <EncryptionEntity>
        <PayloadEncoding>string</PayloadEncoding>
```

```
        <PublicKeyID>string</PublicKeyID>
        <FieldPatterns>
          <Quantity>integer</Quantity>
          <Items>
            <FieldPattern>string</FieldPattern>
          </Items>
        </FieldPatterns>
      </EncryptionEntity>
    </EncryptionEntities>
</ProfileConfig>
```

As shown in the example, the encryption profile defines the data fields to encrypt, the encryption key to encrypt those fields, and a type of profile (e.g., urlencoded, multipart/form-data, JSON, etc.) API calls to create, update, delete profiles can be represented by:

<!-- Create a Profile -->
POST/2017-xx-xx/profile/Front HTTP/1.1
<ProfileConfig xmlns="http://Front.website.com/doc/2017-xx-xx/">
    <CallerReference>string</CallerReference>
    <Comment>string</Comment>
</ProfileConfig>
<!-- Update a Profile -->
PUT/2017-xx-xx/profile/Front/Id/config HTTP/1.1
<ProfileConfig xmlns="http://Front.website.com/doc/2017-xx-xx/">
    <CallerReference>string</CallerReference>
    <Comment>string</Comment>
</ProfileConfig>
<!-- Get a Profile -->
GET/2017-xx-xx/profile/Front/Id HTTP/1.1
<!-- List all Profiles -->
GET/2017-xx-xx/profile/Front?Marker=Marker&MaxItems=MaxItems HTTP/1.1
<!-- Delete a Profile -->
DELETE/2017-xx-xx/profile/Id    HTTP/1.1    If-Match: IfMatch As mentioned, the request may include sensitive information, such as payment information, personally identifiable information, and the like. The information may be processed using resources of the content provider environment to perform a variety of tasks. These resources can be provided using shared resources that are allocated as appropriate, and may include virtual machines, servers, databases, among other such resources. However, as in most environments, such sensitive information is at risk of accidental (or intentional) data loss.

Accordingly, approaches in accordance with various embodiments allow for one or more encryption profiles that specify a type of data to encrypt and the encryption keys to use when encrypting the data. Various approaches can provide a profile editor that a customer (e.g., a customer of the content provider) can use to create and manage encryption profiles that can be used to encrypt data. In some embodiments, a profile editor can comprise a front-end application. This can be a standalone application that customers install or a website accessed through a browser application, among other such options. The logic for the profile editor can allow customers to configure content distributions with a set of request parameters and to provide encryption keys to encrypt user sensitive data. A profile will define encryption settings to be used to encrypt data. A customer can use the editor to select, define, and/or modify the encryption options or other configuration settings for a profile. The encryption options can specify particular encryption keys for encrypting data fields of user-submitted data. Once set, the profile will be used to securely ingest user-submitted data to customers' web servers. For example, a request can be analyzed to determine the data fields of the request. Based on one or more profiles of the customer, the data in those fields can be encrypted with the appropriate encryption key per the profiles.

In the system illustrated in FIG. 1, options module 116 is provided as part of the architecture. The options module can be utilized by a console server 112, encryption manager 114, or other such entity to provide support for new settings and encryptors, among other such options. In some embodiments, the options module can load and render a file, such as an encryption profile, that can allow the customer to view or modify settings to use for a specific type of data. An encryption settings module 118 of the options module can be responsible for pulling the data for a profile from data store 120, or other such location, where the data to be loaded for a profile or at least utilized includes one or more encryption keys. The console server 112 can use this information to generate a dynamic display on the client device 102 that guides the customer through the relevant options for a particular profile. The encryption manager can also use the options module 116 to determine the proper encryption settings for a user-submitted data. For example, the encryption manager can determine the type of user-submitted data and recommend encryption settings for that data. The encryption settings can include, for example, using multiple encryption keys for data in a particular data field, using different encryption keys for data in different data fields, among other such options. Various other components can utilize the options module as well within the scope of the various embodiments.

When generating an encryption profile, a customer can select one or more provided encryption keys within the encryption settings. There may be dozens of encryption keys from which the user can select, and there may be some encryption keys that are not appropriate for a particular data field. The encryption keys can be provided using an editor or other such interface or using one or more API calls. In various embodiments, the encryption keys are generated at the provider environment or otherwise managed by the provider environment and associated with one or more profiles. Example API calls to create, obtain, list, and delete encryption keys can include:

```
<!-- Create Public Key -->
POST/2017-xx-xx/public-key/front HTTP/1.1
<PublicKeyConfig xmlns="http://front.website.com/doc/2017-xx-xx/">
    <CallerReference>string</CallerReference>
    <Comment>string</Comment>
    <Name>string</Name>
    <PublicKey>string</PublicKey>
</PublicKeyConfig>
<!-- Get a Public Key -->
GET/2017-xx-xx/public-key/Front/Id HTTP/1.1
<!-- List all Public Key -->
GET/2017-xx-xx/public-key/Front?Marker=Marker&MaxItems=MaxItems HTTP/1.1
<!-- Delete a Public Key -->
DELETE/2017-xx-xx/public-key/Id HTTP/1.1 If-Match: Watch
```

The encryption settings module can be used to determine which encryption keys to provide as options to the customer through the console, as generated using the console server 112. The console service in this embodiment can be programmed to interact with various service endpoints across the content provider environment 106. The console server also is able to locate and serve up the options module, which can be pulled from a content delivery network (CDN) or other such location. The console server can obtain the schema modeling documents for generating the encryption profiles, and can generate the necessary information so that the relevant encryptor can consume. A JSON file can then be persisted to a location, such as an encryption profile data store 124, which the encryption manager 114, encryptors 122, or other components access in order to dynamically load as needed.

Figure 2:
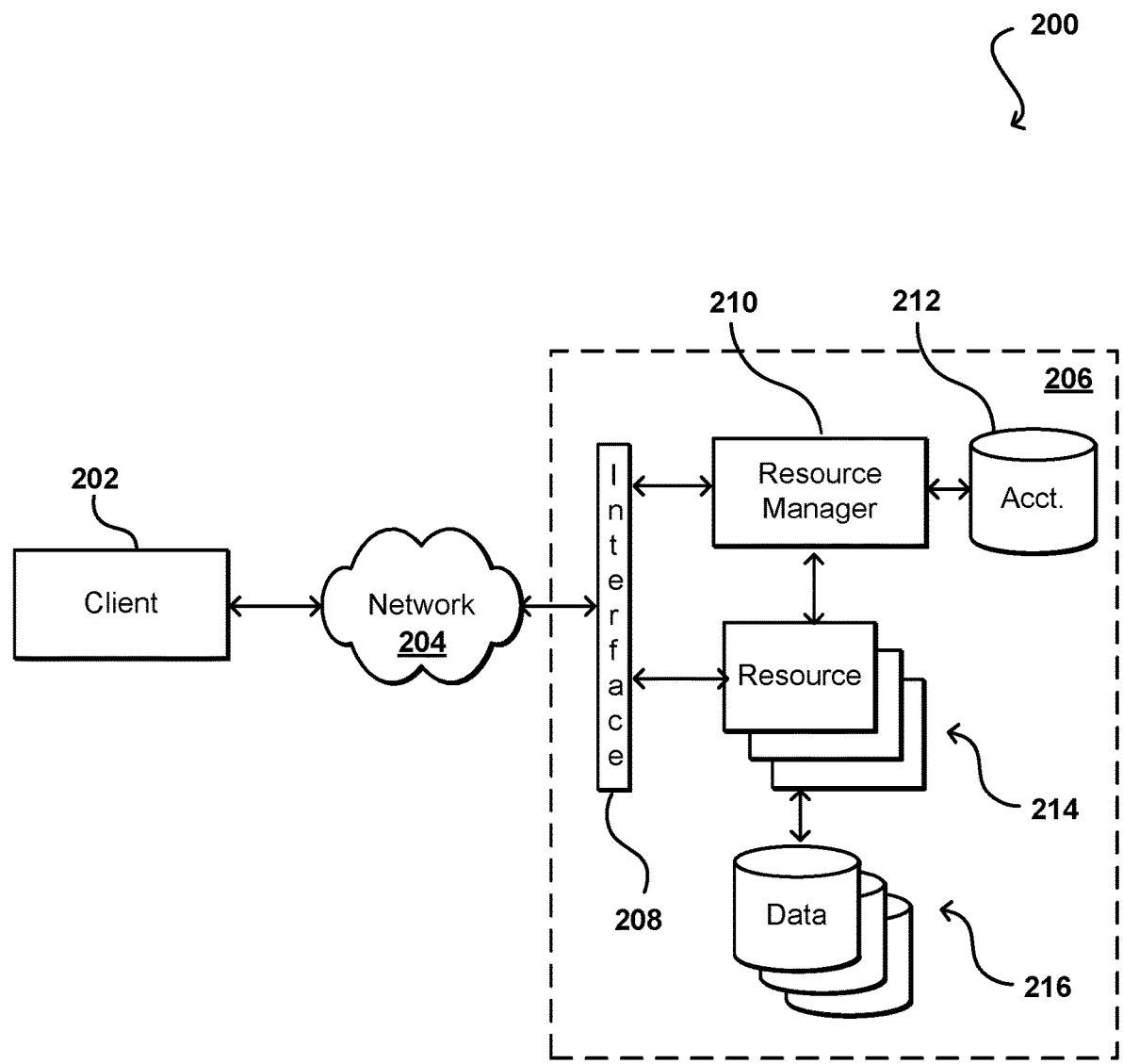
FIG. 2 illustrates an example environment in which various embodiments can be implemented.

FIG. 2 illustrates an example environment 200 in which aspects of the various embodiments can be implemented. Such an environment can be used to allocate resources, or resource capacity, for purposes such as to encode or provide media content, among other such options. In this example a user is able to utilize a client device 202 to submit requests across at least one network 204 to a resource provider environment 206. It should be noted that client device 202 can include client device 102 in FIG. 1. It should be further noted that network 204 can include network 104 in FIG. 1. Further, in accordance with various embodiments, similar components may share or be associated with different reference numbers. The reference numbers are not intended to be limiting and are instead for purposes of explanation. The client device can include any appropriate electronic device operable to send and receive requests, messages, or other such information over an appropriate network and convey information back to a user of the device. Examples of such client devices include personal computers, tablet computers, smart phones, notebook computers, and the like. The network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Approaches in accordance with various embodiments can reduce this burden by utilizing encryption profiles or other such profiles. An encryption profile enables a customer to specify a type of data to encrypt and encryption keys to use when encrypting the data. When creating an encryption profile, a customer (or other appropriate entity) can define a set of parameters, including a respective default value for each parameter. In some embodiments default values may apply if not otherwise specified by the user. The parameters can define many of the encryption options or other configuration settings for the received data. In at least some embodiments, the customer will provide the values through a console or other interface, such as a dedicated application programming interface (API).

In various embodiments, a user utilizing a website or application provided by a customer may submit sensitive information, such as payment information, personally identifiable information, and the like. The website or application may utilize resources of the resource provider environment 206 to perform a variety of tasks. The resources can be provided using shared resources that are allocated as appropriate, and may include virtual machines, servers, databases, among other such resources. Because the website or application is using network resources, it can be desirable to automatically encrypt the information. In order to provide enhanced security, data specific encryption keys can be automatically used to encrypt information. A customer can create one or more profiles to manage encryption options and other configuration settings that specify which data is to be encrypted and which encryption keys are to be used to encrypt the data. The encrypted data is then protected in transit through various subsystems of the network environment. Components which need access to the encrypted data (e.g., a payment processing system needing access to a credit card number) and that have access to appropriate decryption keys can decrypt and use the data as necessary.

Figure 3:
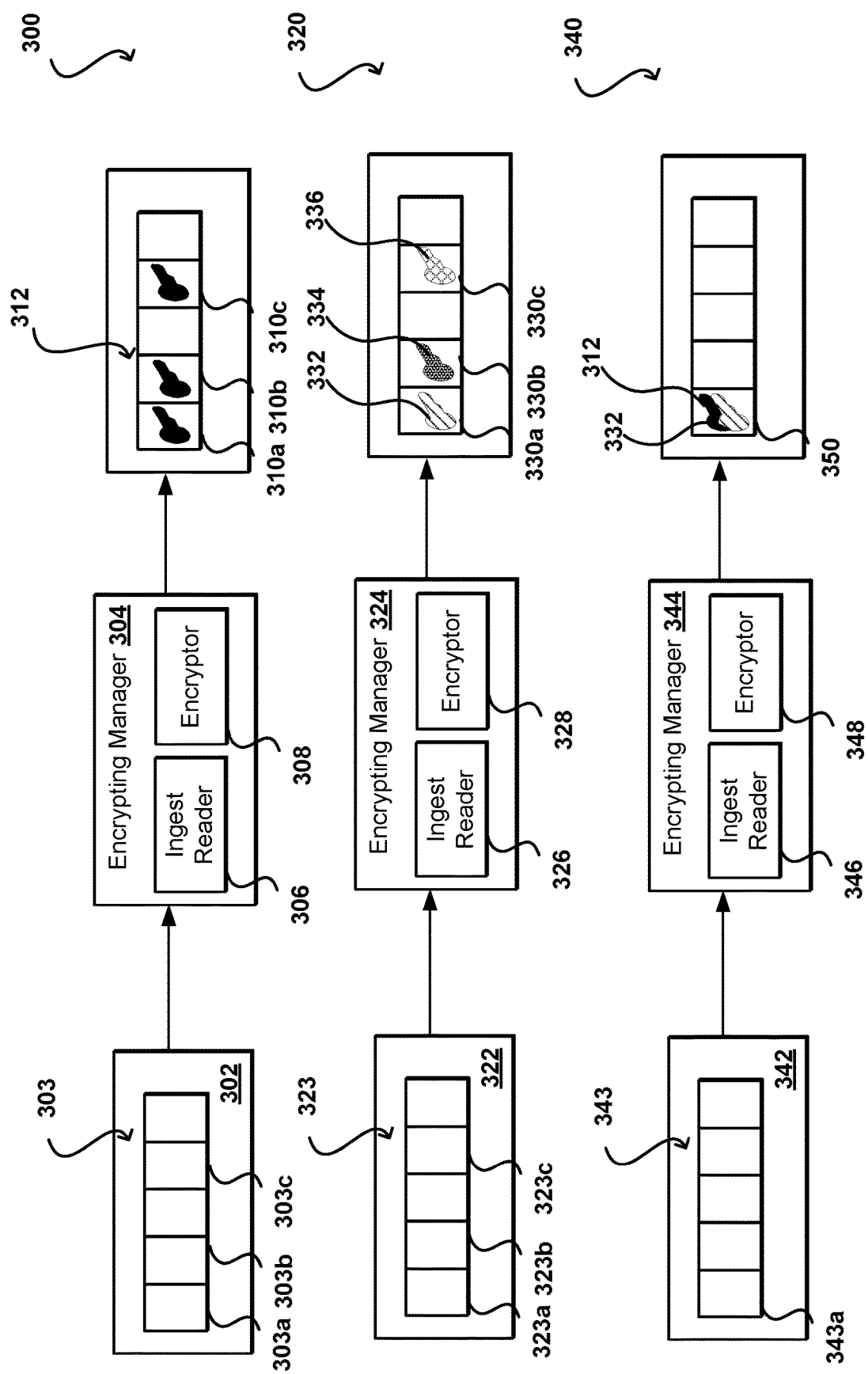
FIG. 3 illustrates an example subsystem for encrypting data that can be utilized in accordance with various embodiments.

FIG. 3 illustrates an example subsystem for encrypting data that can be utilized in accordance with various embodiments. As described, in accordance with an embodiment, a set of request parameters can be used to create a profile, which defines many of the encryption options for received data. The received data can include one or more data fields, and the profile can specify which data field is to be encrypted and which encryption keys are to be used to encrypt those data fields. In example 300, request 302 includes data fields 303*a-c* (contained at least in data field 303). An encryption manager 304 can include ingest reader 306 and encryptor 308. Ingest reader 306 can parse request 302 to determine a data type for each of the one or more data fields 303. Encryptor can access one or more profiles for a customer to determine the encryption keys to be used to encrypt the data fields 303. In this example, data fields 303*a*, 303*b*, and 303*c* are to be encrypted per the profile using encryption key 312. Encryptor 308 can encrypt data fields 303*a*, 303*b*, and 303*c* to generate data fields 310*a*, 310*b*, and 310*c* encrypted under encryption key 312. As mentioned, in various embodiments, this enables customers to securely ingest user-submitted sensitive information to their web servers to ensure that the sensitive data provided by end users is encrypted when received and remains encrypted until authorized access.

In various embodiments, a profile can specify different encryption keys for different data fields. In example 320, request 322 includes data fields 323 and is received at encryption manager 324. Ingest reader 326 parses request 322 to determine a data type for each of the one or more data fields 323. Encryptor 328 accesses one or more profiles for a customer to determine one or more encryption keys to be used to encrypt data fields 323 of request 322. In this example, data fields 323*a*, 323*b*, and 323*c* are to be encrypted using different encryption keys. Per the profile, encryptor 308 encrypts data field 323*a* using encryption key 332 to generate encrypted data field 330*a*, data field 323*b* using encryption key 334 to generate encrypted data field 330*b*, and encrypts data 323*c* using encryption key 336 to generate encrypted data field 330*c*. In various embodiments, using multiple keys can isolate unauthorized access to the data in a data breach because multiple keys are used to encrypt the data. For example, in the situation where an unauthorized user has access to one decryption key, the unauthorized user will not be able to access data encrypted using other encryption keys, thus minimizing unauthorized access to the data. In another example, different subsystems may have access to particular decryption keys. In the situation where one of those subsystems is compromised, the compromised subsystem only has access to data which is encrypted by the key of that subsystem, thus minimizing unauthorized access to data for the other subsystems.

In certain embodiments, a customer may desire to encrypt a data field with more than one key. This can allow for additional security as well as for key rotation among other such options. For example, in example 340, request 342 includes data fields 343 and is received at encryption manager 344. Ingest reader 346 parses request 342 to determine a data type for each of the one or more data fields 342. Encryptor 348 accesses one or more profiles for a customer to determine encryption keys to be used to encrypt data fields 343 of request 342. In this example, data fields 343*a*, 343*b* (not shown), and 343*c* (not shown) are to be encrypted using multiple encryption keys. Per the profile, encryptor 348 encrypts data field 343*a* using encryption keys 332 and 312 to generate encrypted data field 350. It should also be noted that the various keys 312, 332, 334, 336, and 332 can be provided, in various combinations, from client devices, third party providers, content providers, and/or any cloud or online resources, as needed and specified.

In accordance with various embodiments, encryptors 308, 328, and 348 can encrypt data in data fields using any combination of examples 300, 320, and 340. For example, an ingest reader may parse data, and an encryptor may encrypt data in a first and second data field using a first encryption key and data in a third data field using a second and third encryption key. In certain embodiments, an ingest reader or encryptor, or other such component can utilize a machine learning model, such as a neural network based model, feature detection and matching (e.g., filtering) techniques, or a combination of both and/or other techniques to detect sensitive data. In this example, a customer has not identified particular data but a trained model may identify the data as sensitive. In the alternative, an untrained or supervised model may be used. In the situation where data is identified as sensitive, a default encryption key or other encryption key specified by the customer can be used to encrypt the data. For example, as data is ingested, the data can be analyzed using an encryption model. When sensitive data is determined, at least one encryption key can be used to encrypt the determined sensitive data. Determining whether the data is classified as sensitive data can be determined based on analyzing a portion of the ingested data. In this way, the model does not need the entire string of data to make such a determination but can classify portions of the data as potentially sensitive data based on a portion (e.g., 3 bytes) of the ingested data. In this way, a file including data can be broken up into sensitive and non-sensitive data and encrypted and not-encrypted accordingly.

In various embodiments, a notification or other such message can be generated and provided to the user in response to encrypting the data using the model. The customer can provide feedback whether the data should be encrypted. In the situation where the customer identifies that the data should be encrypted, a profile associated with the customer can be updated or created to encrypt data of the identified data type using one or more keys specified by the customer. In the situation where the customer identifiers that the data does not need to be encrypted, an encryptor may not help to encrypt data of that type for at least a period of time. Such a model may be trained on patterns of known sensitive data. The model can be updated over time to recognize and classify data as sensitive data. In certain embodiments, training the model may involve significant use of computation resources and time, such that this may correspond to a preparatory step to servicing requests and/or performed relatively infrequently with respect to search request servicing and/or according to a schedule. Examples of such supervised learning models include decision trees, ensembles (e.g., bagging, boosting, random forest, etc.), k-nearest neighbors, linear regression, naïve Bayes, neural networks, etc. It should be noted that various other models may be implemented, as may include unsupervised learning models and reinforcement learning models. Approaches to unsupervised learning include, for example, clustering (e.g., k-means, hierarchical clustering, etc.) neural networks, etc. Approaches to reinforcement learning include, for example, q-learning, state-action-reward-state-action (SARSA), temporal difference, etc.

Figure 4:
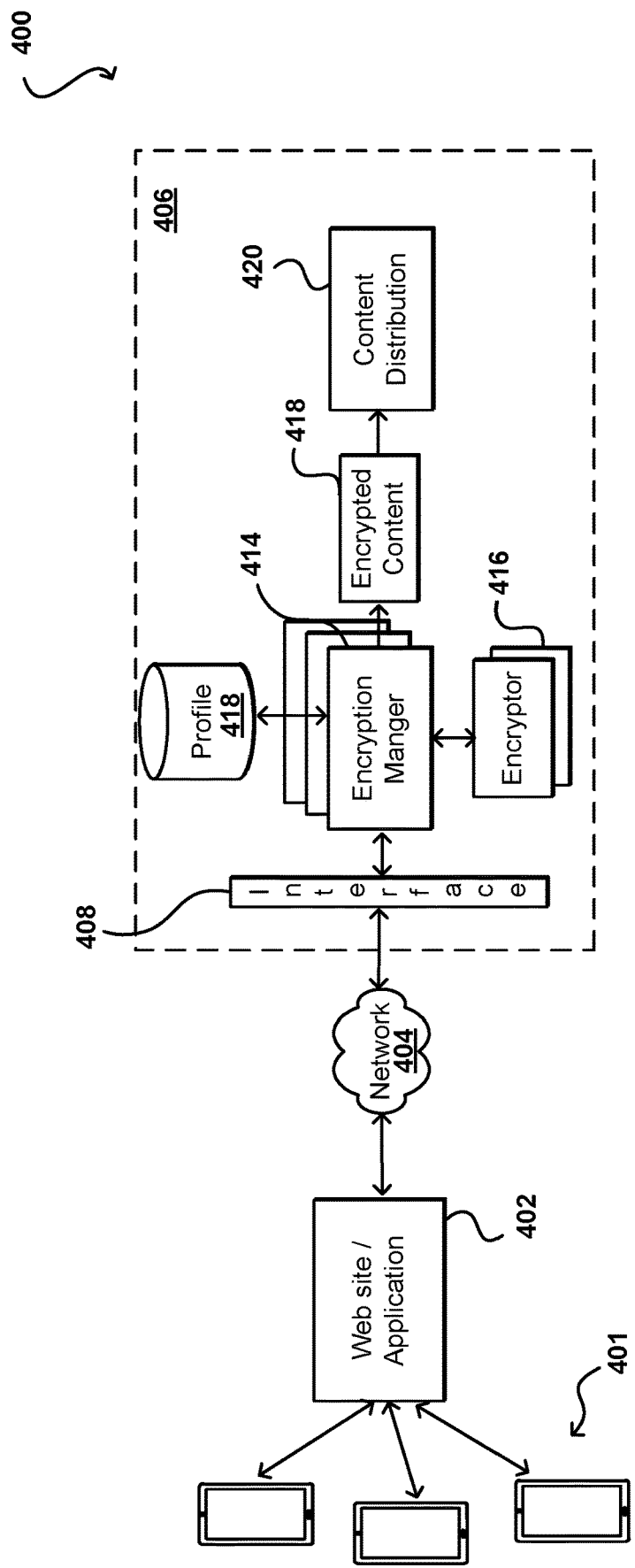
FIG. 4 illustrates example components of a subsystem for encrypting data that can be utilized in accordance with various embodiments.

FIG. 4. illustrates an example system 400 that can be used to implement aspects of the various embodiments. In this example, users utilizing a website or application executing on a client device 401 may submit sensitive information over one or more networks 404 to be received to an interface layer 408 of a content provider environment 406, such as payment information, personally identifiable information, and the like. The website or application may utilize resources of the content provider environment 406 to perform a variety of tasks. The content provider can be a shared resource environment, as discussed with respect to FIG. 2, or a dedicated network used by the content provider as part of a content service offering, among other such options. In an example, the content provider environment can be a content delivery network (CDN). Content delivery networks provide a globally-distributed network of "edge" servers which cache content, such as web videos or other bulky media, more locally to consumers, thus improving access speed for downloading the content. The edge servers can be located in edge locations. An edge location is a geographic location. When a user requests content or submits information via a customer website or application, the request is routed to an edge server that provides the lowest latency (time delay), so that content is delivered with the best possible performance. If the content is already in the edge server with the lowest latency, the content is delivered immediately. If the content is not in that edge server, the content is retrieved from an "origin" server or an HTTP server (for example, a web server) identified as a source for the content. A distribution can be a mapping between the origin server and a domain name or other such network address. It should be noted that the labels "edge" and "origin" are example terms to describe particular servers and any such terms may be used. It should also be noted that the origin server or destination service can be included in the content provider environment or otherwise in communication with the content provider environment.

In this example, an encryption manager 414 can be executing on the processing component and can use an appropriate profile in data store 418 to determine the data to encrypt. One or more encryptors 416, such as may include encrypting applications running on one or more allocated servers (physical or virtual), can encrypt the data using encryption keys other secure approaches per the profile to generate encrypted data 418. The encrypted data can be provided to an appropriate component in the content provider environment by content distribution component 420. The encryption manager can include various processing components such as host machines, virtual machines, and the like. The encryption manager, can also be offered as a service from inside or external to the content provider environment.

FIG. 5A illustrates an example user interface that can be utilized in accordance with various embodiments. In order to encrypt user sensitive data, a customer (or other entity) can first create a profile, such as by using a user interface 500. Although the example relates to a Web interface that might be displayed through a browser, it should be understood that various other interfaces or consoles can be used as well as discussed and suggested herein. In this example, a user can specify a name, description, and other basic values 502 for the profile. The customer can also specify the data fields to encrypt and the encryption keys to use when encrypting the data. In at least some embodiments, the customer may also select whether multiple encryption keys 504 are to be used to encrypt the specified data field. FIG. 5B illustrates an example interface 520 that can be used to associate a key to one or more encryption profiles in accordance with various embodiments. In this interface, a customer can specify a name for an encryption key and can map or otherwise associate the encryption key to a profile. As described, when a request that is associated with user data is received, an encryption manager or other such component can use a profile and associated encryption keys to determine the appropriate data to encrypt, and can pass that data to one or more encryptors, such as may include encrypting applications running on one or more allocated servers (physical or virtual), which can encrypt the data using encryption keys per the profile, Thereafter, the encrypted data can be provided to an appropriate component in the content provider environment.

Figure 6:
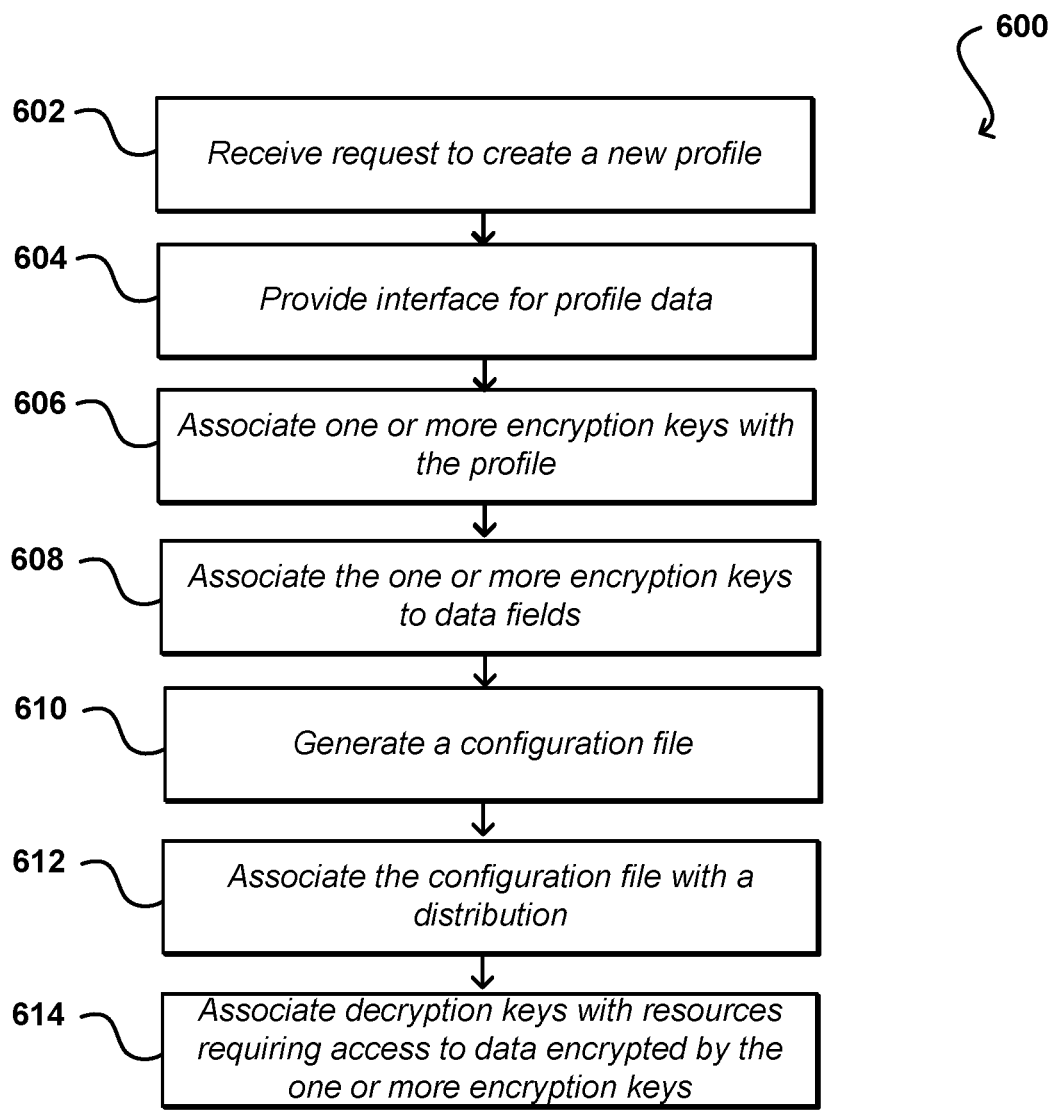
FIG. 6 illustrates an example process for generating profiles that can be utilized in accordance with various embodiments.

FIG. 6 illustrates an example process 600 for creating an encryption profile for that can be utilized in accordance with various embodiments. It should be understood that for any process herein there can be additional, fewer, or alternative steps performed in similar or alternative orders, or in parallel, within the scope of the various embodiments unless otherwise specifically stated. In this example, an instruction is received 602 to create a new profile on behalf of a customer of a provider environment. An interface can be provided 604 that allows the customer to provide values to be used to create the profile. In certain embodiments, as described, one or more API calls can be utilized to create a profile. One or more encryption keys for encryption can be associated 606 with the profile. In an embodiment, the encryption keys can be provided using an interface, such as a graphical user interface, one or more API calls, generated at the provider environment, or otherwise managed by the provider environment, etc.

The encryption keys can be associated with the one or more profiles. The encryption keys can be used to encrypt user data ingested via a website, application, or other such interface where the data can be encrypted by a server closest to the user and remains encrypted until an appropriate resource in or otherwise in communication with a content provider environment utilizes a decryption key or other security credential to access the sensitive data. In this example, the customer can associate 608 one or more encryption keys to particular data fields. Using the interface, a configuration file that specifies a type of request parsing logic (e.g., Json, urlencoded, multipart) to use for a provided data field in a request and a profile to use for encrypting is generated 610. The configuration file is associated 612 with a distribution or other mapping. A distribution can be a mapping between destination resources (e.g., an origin server) and a domain name or other such network address. One or more decryption keys are associated 614 with resources requiring access to data encrypted by the one or more encryption keys. In various embodiments, the content provider environment can be a content delivery network (CDN). The server can be located in an edge location. An edge location can be a geographic location closest to a user. For example, when a user requests content or submits information via a customer website or application, the request is routed to a server that provides the lowest latency (time delay). If the content is already in the server with the lowest latency, the content is delivered immediately. If the content is not in that server, the content is retrieved from an origin server identified as a source for the content. In various embodiments, the request includes user sensitive data for use or storage at a particular processing component. In such a situation, the server at the edge server receives the user-submitted data and can encrypt data fields per one or more user profiles.

Figure 7:
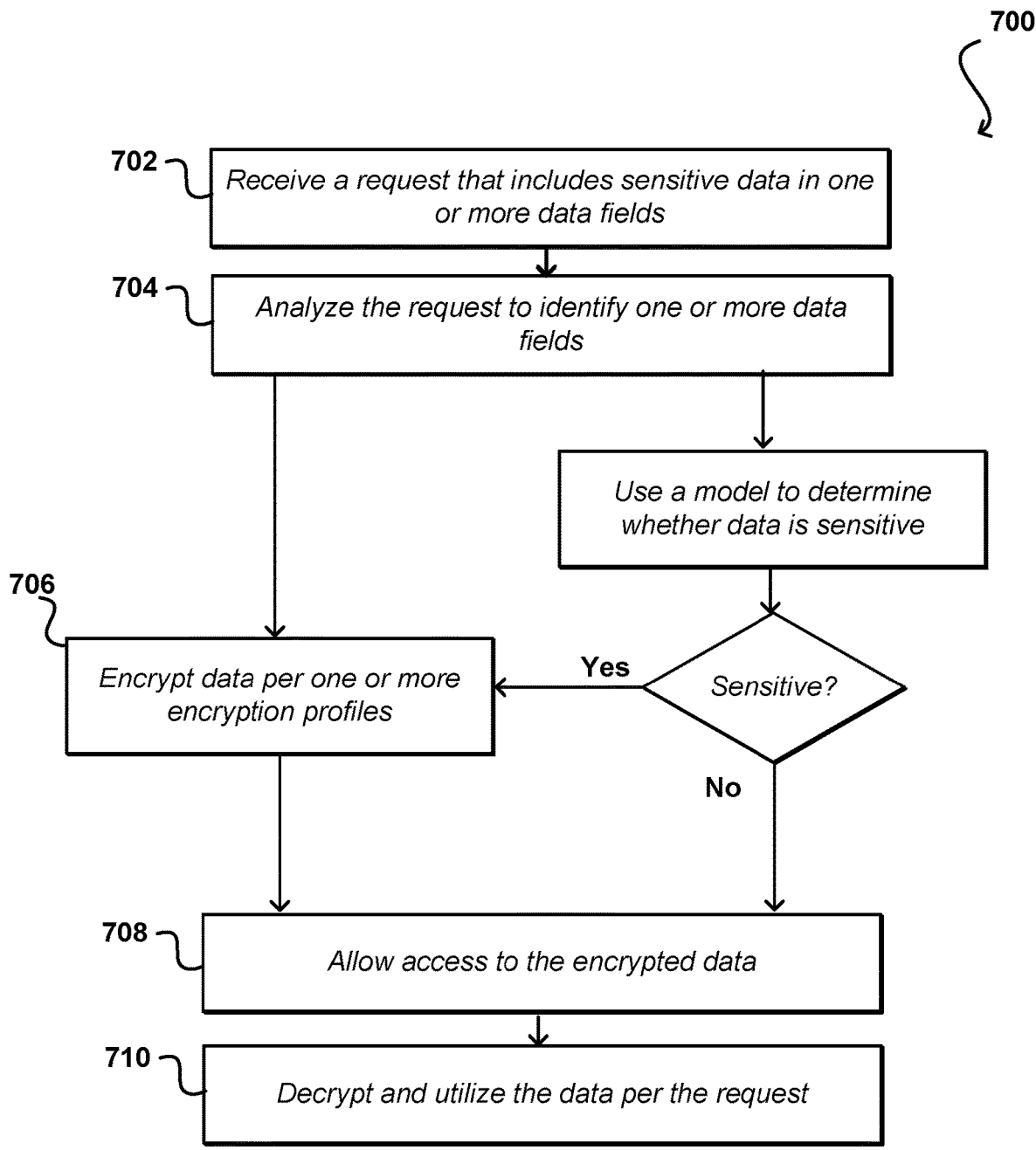
FIG. 7 illustrates an example process for performing data encryption that can be utilized in accordance with various embodiments.

For example, FIG. 7 illustrates an example process for performing data encryption that can be utilized in accordance with various embodiments. In this example, a request from a user for a customer can be received 702. The request may be associated with sensitive information, such as payment information, personally identifiable information, and the like. The information may be processed using resources of the content provider environment to perform a variety of tasks. These resources can be provided using shared resources that are allocated as appropriate, and may include virtual machines, servers, databases, among other such resources. However, as in most environments, such sensitive information is at risk of accidental (or intentional) data loss. Accordingly, the request can be analyzed 704 to identify one or more data fields of the request. As described, the customer may have created one or more profiles, where the profiles specify which data for data fields is to be encrypted or otherwise secured and which encryption keys are to be used to encrypt the data in those data fields. An encryptor or other such component can encrypt 706 the data associated with those fields per the profiles. In the situation where a profile does not specify whether data associated with a particular data field is to be encrypted, the data associated with those data fields can be analyzed 708 using a model or other such machine learning-based approach to determine whether the data is sensitive. In the situation where the data is determined to be sensitive, the data can be encrypted using a default encryption key or other encryption key specified by a profile associated with the customer. Once the data is encrypted, an appropriate component can be allowed 708 access to the encrypted data. For example, the encrypted data or information to obtain the encrypted data can be provided to an appropriate component in or otherwise in communication with the content provider environment. Thereafter, the component can use a decryption key to decrypt 710 the data and utilize the data per the request.

Figure 8:
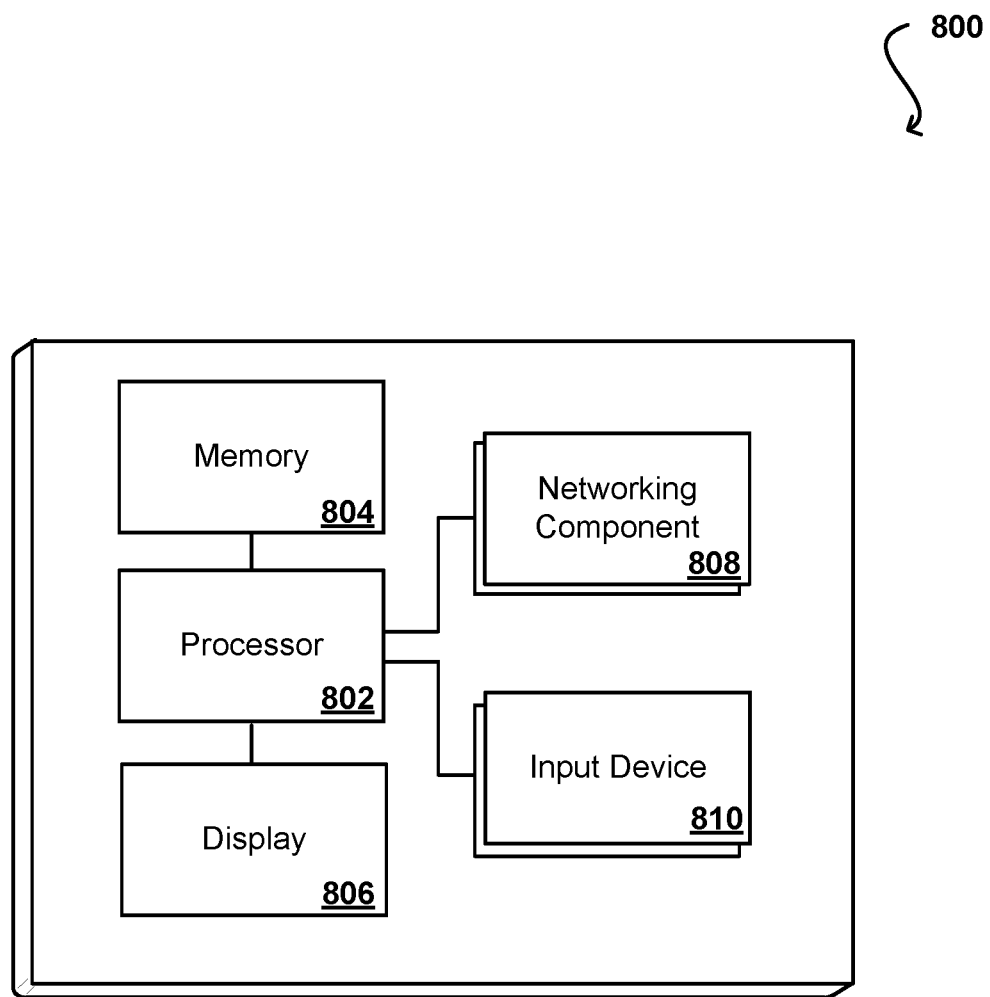
FIG. 8 illustrates example components of a computing device that can be used to implement aspects of various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a first request to create a profile at a resource provider environment, the profile specifying an encryption key for encrypting data, the resource provider environment including a plurality of resources connected over a network;
receiving configuration settings that specify a mapping between an encryption key and a data field;
receiving a second request that is associated with data, the data including at least one data field and being received by an ingest resource of the resource provider environment;
associating a default encryption key with the profile, the default encryption key for encrypting user data not identified by the profile;
encrypting the at least one data field with the encryption key per the profile to generate encrypted data;
allowing a destination resource of the resource provider environment access to the encrypted data; and
decrypting the encrypted data at the destination resource using a decryption key per the profile.

2. The computer-implemented method of claim 1, further comprising:
using a trained model to analyze the user data;
determining sensitive data in the user data not included in the at least one data field; and
encrypting the sensitive data using the default encryption key.

3. The computer-implemented method of claim 1, further comprising:
obtaining data from a plurality of users;
obtaining information that identifies portions of the data as including sensitive data; and
training a model on the portions to generate a trained model operable to classify data as sensitive.

4. The computer-implemented method of claim 1, further comprising:
providing a notification that includes one or more user-selectable elements to indicate whether the encrypted data includes sensitive data.

5. A computer-implemented method, comprising:
receiving a request that is associated with data, the data including at least one data field and being received by an ingest resource of a resource provider environment, the resource provider environment including a plurality of resources connected through a network;
determining whether to encrypt the at least one data field with an encryption key per a profile, the profile specifying at least one encryption key for encrypting user-submitted data;
using one of a trained model, an untrained model, or a reinforced model to analyze the data;
determining potentially sensitive data in the data not included in the at least one data field;
encrypting the potentially sensitive data using a default encryption key associated with the profile to generate encrypted potentially sensitive data; and
allowing a destination resource of the resource provider environment access to the at least one data field.

6. The computer-implemented method of claim 5, further comprising:
providing an interface to generate the profile, the interface including options to associate one or more encryption keys with the profile, map encryption keys to data fields, or name the profile.

7. The computer-implemented method of claim 5, further comprising:
receiving configuration settings via an application program interface (API) to generate a profile, the configuration settings including information associating one or more encryption keys with the profile and data fields to encrypt using the one or more encryption keys.

8. The computer-implemented method of claim 5, wherein the at least one data field includes a first data field and a second data field, the method further comprising:
encrypting the first data field with a first encryption key per the profile and the second data field with a second encryption key per the profile, the first encryption key different from the second encryption key.

9. The computer-implemented method of claim 5, further comprising:
encrypting the at least one data field with a first encryption key and a second encryption key per the profile, the first encryption key different from the second encryption key.

10. The computer-implemented method of claim 5, further comprising:
providing a notification to at least one interface that includes one or more user-selectable elements indicating whether the encrypted potentially sensitive data includes user identified sensitive data.

11. The computer-implemented method of claim 10, further comprising:
receiving a selection of one of the user-selectable elements indicating the encrypted potentially sensitive data includes user identified sensitive data; and
updating the trained model to encrypt data fields associated with the potentially sensitive data.

12. The computer-implemented method of claim 10, further comprising:
receiving a selection of one of the user-selectable elements indicating the encrypted potentially sensitive data does not include sensitive data; and
updating the trained model to ignore data fields associated with the potentially sensitive data.

13. The computer-implemented method of claim 5, further comprising:
encrypting the at least one data field with the encryption key per the profile to generate encrypted data; and
providing the encrypted data for decryption at the destination resource using a decryption key specified by the profile.

14. A system, comprising:
at least one processor; and
memory including instructions that, when executed by the at least one processor, cause the system to:
receive a request that is associated with data, the data including at least one data field and being received by an ingest resource of a resource provider environment, the resource provider environment including a plurality of resources connected through a network;

receive the data from a user through one of a web site or application provided by a customer of the resource provider environment to the ingest resource;

determine whether to encrypt the at least one data field with an encryption key per a profile, the profile specifying at least one encryption key for encrypting user-submitted data; and allow a destination resource of the resource provider environment access to the at least one data field.

15. The system of claim 14, wherein the instructions when executed further cause the system to:

use a trained model to analyze the data;

determine potentially sensitive data in the data not included in the at least one data field;

receive an indication that the potentially sensitive data includes user identified sensitive data; and provide an interface to associate an encryption key with a data field associated with the user identified sensitive data.

16. The system of claim 15, wherein the trained model includes a supervised learning model.

17. The system of claim 14, wherein the encryption key and a decryption key are a key pair, the encryption key being a public key specified by the customer of the resource provider environment and the decryption key a private key to the public key.

* * * * *